United States

[11] 3,633,992

[72] Inventors Teiji Uchida;
Motoaki Furukawa; Shogo Yoshikawa, all of Tokyo; Ichiro Kitano; Ken Koizumi, both of Kobe-shi, all of Japan
[21] Appl. No. 848,380
[22] Filed July 7, 1969
[45] Patented Jan. 11, 1972
[73] Assignee Nippon Selfoc Company, Limited Tokyo, Japan
[32] Priorities July 5, 1968
[33] Japan
[31] 43/47355;
July 5, 1968, Japan, No. 43/47356

[54] FARADAY-EFFECT ELEMENT
4 Claims, 4 Drawing Figs.
[52] U.S. Cl.......................................... 350/151, 350/175 GN, 350/96 T
[51] Int. Cl....................................................... G02f 1/22
[50] Field of Search............................................ 350/96 W, 96 OT, 151, 96 R, 96 T, 175 GN; 324/96

[56] References Cited
UNITED STATES PATENTS
3,030,852  4/1962  Courtney-Pratt.............  350/151 X
3,083,123  3/1963  Navias..........................  350/175 UX
3,320,114  5/1967  Schulz..........................  350/96 UX
3,434,774  3/1969  Miller...........................  350/96

OTHER REFERENCES

Miller, " Light Propagation in Generalized Lens-Like Media," Bell System Tech. J., Vol. 44, No. 9 (Nov. 1965) pp. 2,017– 2,030
Kawakami et al., " Propagation Loss in a Distributed Beam Waveguide," Proc. IEEE (Dec. 1965) pp. 2,148– 2,149

*Primary Examiner*—David Schonberg
*Assistant Examiner*—Paul R. Miller
*Attorney*—Sandoe, Hopgood and Calimafde ABSTRACT: A novel Faraday-effect element having a refractive index highest along the axis and decreasing toward the surface is produced by immersing a thin elongated glass body containing an oxide selected from the group consisting of paramagnetic- and diamagnetic-type oxides composed of at least first cations, in a bath of salt including second cations having a smaller ration of the electronic polarizability to the third power of the ion radius than said first cations. The bath is maintained at a temperature to permit said second cations to diffuse into said glass body so that said first cations may be substituted by said second cations.

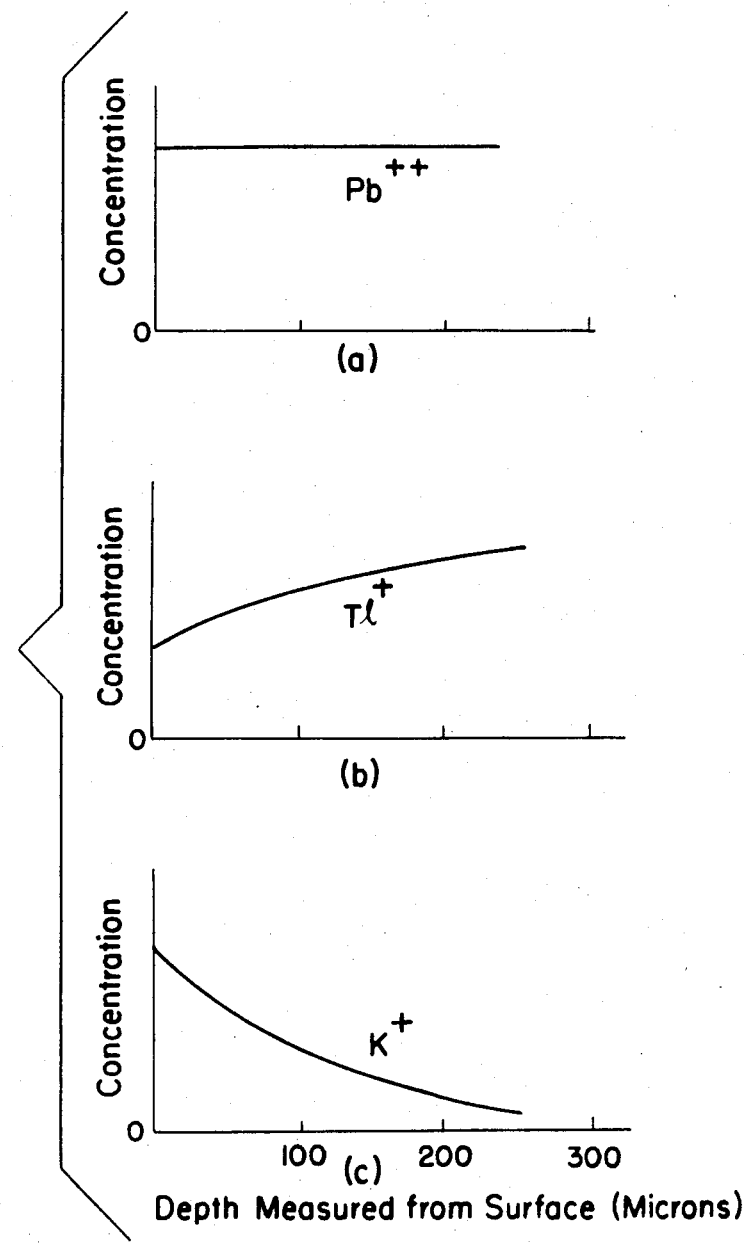

FARADAY-EFFECT ELEMENT

BACKGROUND OF INVENTION

This invention relates to a Faraday-effect element, and, in particular, such an element for use as an optical isolator. The Faraday effect is the property of transparent substances by which the plane of polarization is rotated when the material is placed in a magnetic field, for light propagated along the magnetic field.

The angle $\theta$ of the rotatory polarization of a Faraday-effect element is given by $\theta = VHL$, where $H$ stands for the magnetic field intensity in the direction of travel of the light wave, $L$ for the optical length of the light transmission medium in the magnetic field, and $V$ is a constant. The constant $V$ is called Verdet's constant and is deemed positive when it gives rotatory polarization in the direction of the current flowing through the solenoid being provided to generate the magnetic field $H$. It is well known that the direction of the rotatory polarization depends on the direction of the magnetic field and not on the direction of travel of the light wave being subjected to the rotatory polarization.

In order to be suited for use in a Faraday-effect element the material employed should have a well-stabilized Verdet's constant $V$ of large absolute value, and small attenuation constant. In other words, such a material should be transparent and not produce any adverse effects upon the wave surface of the light wave. Materials which meet these requirements include some types of glass containing paramagnetic or diamagnetic materials. Heavy lead silicate glass, terbium-alumina-silicate glass, terbium-metaphosphate glass, and cerium-phosphate glass are typical examples. However, in order to obtain a rotatory polarization of $\pi/4$ radian with such Faraday-effect materials, assuming a magnetic field of 1,000 oersteds, the optical path within the material would extend over scores of centimeters. If an auxiliary lens is not sufficient to completely remove the divergence at the Faraday-effect element, the cross section normal to the axis should be large enough to tolerate the divergence. However, a glass light guide of large cross section is not easy to bend.

OBJECT OF INVENTION

Accordingly, it is the object of the present invention to provide Faraday-effect elements of converging capability which overcome the above-mentioned difficulties.

BRIEF SUMMARY OF INVENTION

Briefly, the invention is predicted upon the concept of providing a fibrous glass element which has paramagnetic or diamagnetic properties with a reflective index which is highest at the axis and gradually decreases toward the surface. According to the method of the invention, such an element may be produced by substituting from the surface cations of lower electron polarization/(ion radius)$^3$ for those initially present in the glass.

GENERAL DESCRIPTION OF THE INVENTION

In a paper published in the Bell System Technical Journal, July 1964 issue, pages 1,469–1,479, D.W. Berreman describes a so-called gas lens in which gas within a pipe is given a gradient in the refractive index to avoid the divergence in a light beam travelling therethrough. Also, in a contributed paper by S. Kawakami and J. Nishizawa published in the Proceedings of the IEEE, Dec. 1965 issue, pages 2,148–2,149, an application of the theory of the gas lens to the solid-state transparent body to form a fibrous converging light guide is suggested.

In such a converging light guide, a light beam incident at one end surface is propagated along the light guide oscillating about its axis, without diverging. Thus, the phase velocity difference and the divergence of the beam observed at the output end surface of the light guide are minimized in such a converging light guide. As in the case of the gas lens, an optical image projected on the input end surface of the light guide can be transmitted substantially as is to the output end. Furthermore, as long as the radius of curvature of the guide is greater than a specific lower limit, the bending of the light guide will not produce any adverse effect on the propagation of the light beam within the light guide.

More specifically, the transmission of an optical image is made possible only when the refractive index symmetrically decreases toward the surface of the light guide with respect to the axis of the light guide, and particularly when the refractive index $n_r$ is given by $$n_r = n_0 (1 - ar^2),$$

where $r$ stands for the radial distance from the axis in cross section of the light guide, $n_0$ for the refractive index at the axis, and $a$ for a positive constant.

The spot size $W_0$ of the light beam of the fundamental mode matched with a light guide of the above-mentioned refractive index distribution is given by $$W_0 = \left(\frac{\lambda}{\pi n_0}\right)^{\frac{1}{2}} 2^{-\frac{1}{4}} a^{-\frac{1}{4}}$$

where $\lambda$ stands for the light wavelength in free space. The mode-matched light beam has a constant cross section within the light guide. Also, the optical paths taken by a plurality of light beams and viewed at a plane normal to the direction of the travelling of the light beams are quite regular. The function of the light guide restraining the light beam from diverging is referred to hereunder as the converging property.

The refractive index of glass depends principally on its composition. Therefore, a refractive index gradient may be given to a Faraday-effect element of the fibrous light guide type by giving a suitable gradient in composition to a glass of Faraday rotation capability so that the refractive index decreases from the axis toward the surface thereof.

It is well known in this technical field that the rare earth elements such as cerium, europium, and terbium give paramagnetic property to glass and that lead, thallium and other similar metals make glass diamagnetic. It has been deemed almost impossible, however, to provide a fibrous glass light guide which has not only a gradient in the refractive index, but also paramagnetic or diamagnetic properties.

In general, oxide glass is composed of glass-composing oxides ($SiO_2$, $B_2O_3$, $P_2O_5$, etc.) and modifying oxides. Glass having a paramagnetic or diamagnetic property contains the oxides of paramagnetic or diamagnetic property as the modifying oxides. We have discovered that if the ratio of each of the oxides contained in the modifying oxides is gradually changed toward surface while the molecular ratios of the glass-composing oxide to the modifying oxides are kept unchanged, a glass body is obtained whose refractive index changes gradually in the direction normal to the axis of the light guide. Based on this discovery, it has become possible to provide the Faraday-effect elements of paramagnetic or diamagnetic property whose refractive index decreases from the axis toward the surface of the light guide.

In general, the refractive index of a substance is closely related to molecular refraction and molecular volume inherent to the substance. More specifically, the greater the molecular refraction is, or the smaller the molecular volume is, the greater is the refractive index. On the other hand, the molecular refraction is proportional to the polarizability of the substance. In general also, the molecular refraction of glass is approximated by the summation of molecular refractions of individual ions. Therefore, the qualitative effect of the existence of those ions on the refractive index of glass can be determined by comparing, within the glass, values of electronic polarization per unit volume of the related ions, or the values expressed by $$\frac{\text{electron polarizability}}{(\text{Ion radius})^3}$$

Among the cations capable of composing the modifying oxides, lithium, sodium, potassium, rubidium, cesium, and thallium are typical examples suited for changing the above-mentioned ratio. Table 1 shows, as to each of these ions, the ion radius, electron polarizability, and the above mentioned ratio, electron polarizability/(ion radius)$^3$.

TABLE I

| Ion | Ion Radius (A.) | Electron Polarizability (A.$^3$) | Electron Polarizability/ (ion radius)$^3$ |
|---|---|---|---|
| Li$^+$ | 0.78 | 0.03 | 0.0632 |
| Na$^+$ | 0.95 | 0.41 | 0.478 |
| K$^+$ | 1.33 | 1.33 | 0.565 |
| Rb$^+$ | 1.49 | 1.98 | 0.599 |
| Cs$^+$ | 1.65 | 3.34 | 0.744 |
| Tl$^+$ | 1.49 | 5.2 | 1.572 |

Since each ion has its inherent ratio of the electron polarizability to (ion radius)$^3$, the refractive index of the glass containing cations composing modifying oxides is larger than that of glass whose above-mentioned cations are totally or partially substituted by the cations having the ratio smaller than those of the above-mentioned oxides.

As will be clearly understood from the foregoing, a Faraday-effect element of the fibrous light guide type which has the refractive index decreasing toward the surface of the light guide within the plane normal to its axis can be obtained by increasing the concentration in glass of the modifying-oxides-constituting cations towards its surface. This increase in the cation concentration results in the decrease, in the direction from the glass body axis toward its surface, of the concentration of other cations, for example, those having paramagnetic or diamagnetic properties which compose the modifying oxides having greater electron-polarizability-to-(ion radius)$^3$ ratio than the cations composing the modifying oxides.

The modifying-oxide-composing cations contained in glass may be of three or more kinds. Assuming, for example, that three different kinds of cations having mutually different electron-polarizability-to-(ion radius)$^3$ ratios are called A ion, B ion, and C ion, in the order of the value of the ratio, a glass body in which the concentration of B ion increases in the direction from the interior toward the surface while those of both ions A and C decrease in the same direction, has a refractive index distribution which gradually decreases toward the surface if the difference of C and B ions in the electron-polarizability-to-(ion radius)$^3$ ratio is considerably smaller than the corresponding difference between B and A ions, or if the variation in the concentration of C ions is smaller than any of those of A and B ions. In other words, the refractive index assumes a distribution within a plane normal to the light guide which is highest at the axis and decreases toward the surface thereof, because the existence of A and B ions cancels the effect of C ions. Assuming further that the A ion is a diamagnetic ion of great electron polarizability as is exemplified by Tl$^+$, and that B and C ions are similar ions of relatively small electron polarizability as exemplified respectively by K$^+$ and Na$^+$, the Verdet's constant V is held to gradually decrease toward the surface of the Faraday-effect element.

According to the present invention, the Faraday-effect element is manufactured through the following process. A fibrous glass containing first cations capable of composing the modifying oxides is brought into contact with such salt as includes second cations capable of composing the modifying oxides of smaller electron-polarizability-to-(ion radius)$^3$ ratio, so that first cations distributed on the surface region of the glass may be substituted by the second cations in the salt. To facilitate the substitution, the salt and glass are heated up to the temperature at which both the first and second cations are able to diffuse within the glass. As a result of the diffusion of the second cations into the glass through the boundary surface between the salt and glass, a portion of the first cations which have been contained within the glass emerges from the glass through diffusion. This results in the substitution of the first cations in the surface region of the glass by the second cations in the salt. The concentration of the second cations diffused into the glass is highest at the surface of the glass body and decreases toward its axis.

Conversely, the concentration of the first cations which existed within the glass in the initial stage of processing tends to decrease at the surface region. It is highest at the axis of the glass body and decreases toward its surface in proportion to the distance from the axis. It follows, therefore, that after the ion substitution process the refractive index is lowest at its surface and increases toward its axis in proportion to the depth. The refractive index at the axis would virtually be that of the glass body before being subjected to the ion substitution.

The refractive index distribution within the interior of the glass body is affected by various conditions. As to an ordinary elongated cylindrical glass body having a circular cross section, the refractive index distribution is dependent upon the dimension and geometry of the glass body before the ion substitution process upon the composition of the salt for the ion substitution bath, and upon the temperature and duration of the substitution processing. Since the degree of the ion diffusion within the glass body depends on the distance from the surface brought into direct contact with the salt, the refractive index of the cylindrical rod-shaped glass body has, after the ion substitution, a symmetrical distribution of the refractive index with respect to the axis of the body. When viewed at its circular cross section, the refractive index is symmetrically dependent on the radial distance from the axis. Selection of the various conditions of the above-mentioned processing make it possible to approximate the refractive index gradient to the ideal quadratic one.

The Faraday-effect element manufactured according to this invention provides an optical isolator particularly adapted to the ultra-high-speed pulse signal transmission, because phase velocity difference and light beam divergence are completely avoided within the glass body.

The Faraday-effect element according to this invention does not need any auxiliary lens for light beam convergence, because of the above-mentioned converging property. Also, the element itself is formed into a thin glass fiber having a circular cross section of several tens of microns in diameter. This facilitates the miniaturization of the solenoid coil employed for generating magnetic field to be applied to the Faraday-effect element, facilitating the miniaturization of the optical isolator as a whole. Also, the flexibility and the converging property of the fibrous body allow the isolator to be arbitrarily bent. Particularly, when the refractive index gradient is made greater or, in other words, when the above-mentioned constant $a$ is made greater, the spot $W_0$ can be made smaller, allowing a greater bend in the fibrous body.

The mode-matched light beams made incident upon the light guide at the input end surface of the fibrous element travels through the element oscillating about its axis, except for such a light beam as is made incident perpendicularly to the input end surface at its center, this beam travels along the axis. It is assumed here that the magnetic field applied to the Faraday-effect element along its axis is uniform over its cross section normal to the axis. Since the diameter of the element is sufficiently small, this assumption is easily justified.

The above-mentioned and other features and objects of this invention and the manner of attaining them will become more apparent and the invention itself will best be understood by reference to the following description of the invention taken in conjunction with the accompanying drawings, the description of which follows.

FIGS. 1 and 2, respectively, show the refractive index characteristics and ion concentration distribution of the Faraday-effect element manufactured according to the present invention; and FIGS. 3 and 4 show the Faraday-effect element of the invention as an optical isolator.

DETAILED DESCRIPTION OF THE INVENTION

Example 1

Figure 1:
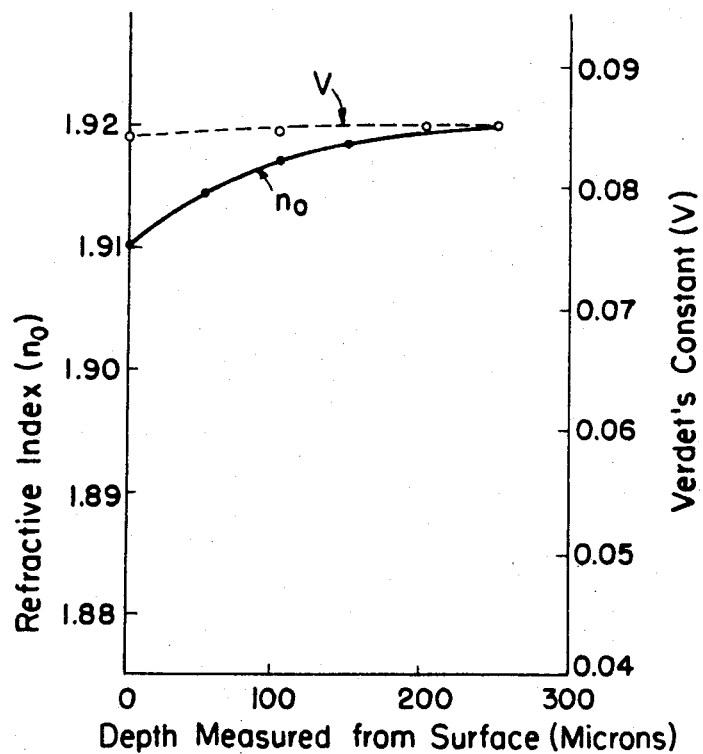

A thin glass rod of a circular cross section of 0.5 mm. in diameter containing 14.0 weight percent of $Tl_2O$, 66.2 weight percent of PbO, and 19.8 weight percent of $SiO_2$ is immersed for 16 hours in a potassium nitrate bath containing 0.5 weight percent of thallium nitrate and maintained at 400° C. The glass rod is removed from the bath, rinsed and dried. The refractive index $N_d$ at its axis and surface is 1.92 and 1.91, respectively. The refractive index gradient within the glass rod is as shown in FIG. 1. This curve is approximated by the above-mentioned expression $n_r=n_0(1-ar^2)$, with $a=8.34$ cm$^{-2}$.

The glass rod is then subjected to the electromicroprobe X-ray analysis to determine the concentration of $Pb^{++}$, $Tl^+$, and $K^+$ ions. The result is as shown in FIG. 2, in which the ordinates show relative values of concentration. These graphs clearly show that a portion of $Tl^+$ ions were substituted by $K^+$ ions, and that this substitution has clear correspondence to the refractive index gradient shown in FIG. 1. The Verdet's constant for a light wave of 0.6328 micron in wavelength shows very little variation taking the value at 0.085 min./Oe cm., as shown in FIG. 1.

Two end surfaces of the glass rod are then polished to form a 30 cm. long rod having smooth end surfaces normal to its axis. After disposing the glass rod along the axis of a solenoid, the solenoid is energized to apply a magnetic field to the rod. With suitable adjustment of the energizing current, rotatory polarization of $\pi/4$ radian is attained as to the mode-matched output light beam of a He-Ne laser. The error in the angle of the rotatory polarization and the loss caused by the light beam dispersion are virtually negligible. No difference in the phase velocity is observed in the light wave which has passed through the glass rod.

Example 2

A thin glass rod of a circular cross section of 0.2 mm. in diameter containing 20.0 weight percent of $Tl_2O$, 12 weight percent of $Na_2O$, 20 weight percent of PbO, and 11.8 weight percent of $SiO_2$, is immersed for 12 hours in a potassium nitrate bath maintained at 450° C. The glass rod is then removed from the bath, rinsed and dried. The refractive index $n_d$ at its axis and surface is 1.60 and 1.57, respectively. The gradient in the refractive index in the rod is approximated by $n=n_d(1-ar^2)$, with $a=1.88\times10^2$ (cm$^{-2}$). The concentration of $Tl^+$ and $Na^+$ ions decreases toward the surface of the rod, while the concentration of $K^+$ ions increases toward the surface, it is observed. The experimental results quite similar to the rod of example 1 were obtained as to the 60 cm. long sample of the example 2.

Example 3

A glass rod of circular cross section of 0.2 mm. in diameter containing 10 weight percent of $Cs_2O$, 16 weight percent of $Na_2O$, 10 weight percent of PbO, and 64 weight percent of $SiO_2$ is kept immersed for 24 hours in a potassium nitrate bath maintained at 400° C. The glass rod is then removed from the bath, rinsed, and dried. The refractive index $n_d$ at its axis and surface is 1.521 and 1.507, respectively. The refractive index distribution is well approximated by the expression $n=n_d(1-ar^2)$, with $a=92$(cm.$^{-2}$). It is observed after the above-mentioned process that the concentration of $P^{++}$ ions is kept constant, while that of $Cs^+$ ions decreases and that of $Na^+$ ions increases in the direction from the axis of the rod toward its surface. The experimental results obtained with regard to a 100 cm. long sample of example 3 proved to be quite similar to those of example 1.

Figure 3:
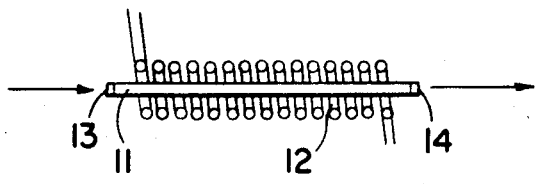

In FIG. 3, which schematically shows the Faraday-effect element manufactured through the above-described process, a solenoid 12 is disposed surrounding the Faraday-effect rod 11. To the input and the output end surfaces of the rod 11 is attached a pair of polarizer plates 13 and 14. The polarizer 14 at the output end serves as the so-called analyzer. The light beam made incident upon the rod 11 at its polarizer 13 in the direction shown by an arrow, is linearly polarized by the first polarizer 13 and subjected to the rotatory polarization while traveling through the rod 11, to which the magnetic field is applied by the solenoid 12. Adjusting the magnetic field intensity to a favorable value through control of the current flowing through the solenoid, the rotatory polarization of $\pi/4$ radian is easily attained.

Figure 4:
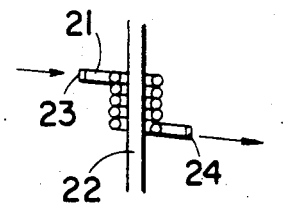

In the embodiment of FIG. 4, the Faraday-effect element 21 is formed into a coil. Along the axis of the coil-shaped element 21, a conductor is disposed to apply circular magnetic field to the coil 21. At the input and output ends of the element 21, a pair of polarizers 23 and 24 are attached, corresponding to polarizers 13 and 14 of the embodiment of FIG. 3.

While the principles of the invention have been described in connection with specific apparatus, it is to be clearly understood that this description is made only by way of example and not as a limitation to the scope of the invention.

What is claimed is:

1. A Faraday-effect element made of fibrous cylindrical glass disposed in a magnetic field substantially parallel to the cylindrical glass axis, said glass containing at the said axis 2 to 65 percent by weight of $Tl_2O$, less than 75 percent by weight of PbO, and 15 to 70 percent by weight of $SiO_2$, wherein the concentration of $Tl_2O$ decreases continuously toward the surface of said glass, whereby the refractive index $n_r$ of said glass decreases substantially according to the relation $n_r=n_0(1-ar^2)$ where $n_0$ is the refractive index at said axis, $r$ is the radial distance from said axis, and $a$ is a positive constant.

2. A Faraday-effect element as claimed in claim 1, wherein the two end surfaces of said element are polished into optically smooth surfaces normal to said axis.

3. A Faraday-effect element as claimed in claim 1, wherein said element is rectilinear and disposed in parallel with the magnetic field generated by a solenoid along whose axis said element is disposed.

4. A Faraday-effect element as claimed in claim 1, wherein said element is formed into a helix and disposed in parallel with the magnetic field generated by a rectilinear conductor laid along the axis of said helix.

* * * * *